US012512579B2

(12) United States Patent
Gonzalez et al.

(10) Patent No.: US 12,512,579 B2
(45) Date of Patent: Dec. 30, 2025

(54) ANTENNA DEVICE WITH RADIATING LOOP

(71) Applicant: HUAWEI TECHNOLOGIES CO., LTD., Shenzhen (CN)

(72) Inventors: Ignacio Gonzalez, Munich (DE); Bruno Biscontini, Munich (DE); Dmitrij Semilovsky, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 358 days.

(21) Appl. No.: 18/192,842

(22) Filed: Mar. 30, 2023

(65) Prior Publication Data

US 2023/0238687 A1 Jul. 27, 2023

Related U.S. Application Data

(63) Continuation of application No. PCT/EP2020/077793, filed on Oct. 5, 2020.

(51) Int. Cl.

| | |
|---|---|
| ***H01Q 1/24*** | (2006.01) |
| ***H01Q 5/378*** | (2015.01) |
| ***H01Q 7/00*** | (2006.01) |

(52) U.S. Cl.

CPC ............. *H01Q 1/246* (2013.01); *H01Q 5/378* (2015.01); *H01Q 7/00* (2013.01)

(58) Field of Classification Search

CPC .......... H01Q 1/24; H01Q 1/246; H01Q 1/521; H01Q 1/523; H01Q 5/378; H01Q 7/00

See application file for complete search history.

(56) References Cited

U.S. PATENT DOCUMENTS

| | | | |
|---|---|---|---|
| 3,858,220 | A | 12/1974 | Arnow |
| 2004/0263392 | A1 | 12/2004 | Bisiules et al. |
| 2016/0043469 | A1 | 2/2016 | Tsubaki et al. |
| 2019/0319352 | A1 | 10/2019 | Gonzalez et al. |
| 2020/0127389 | A1 | 4/2020 | Li et al. |
| 2020/0243970 | A1 | 7/2020 | Segador Alvarez et al. |

FOREIGN PATENT DOCUMENTS

| | | | | |
|---|---|---|---|---|
| EP | 3168927 | A1 | 5/2017 | |
| FR | 3033449 | A1 | 9/2016 | |
| WO | WO-2022002257 | A1 * | 1/2022 | ............. H01Q 1/246 |
| WO | 2022022804 | A1 | 2/2022 | |

OTHER PUBLICATIONS

Korean Office Action issued in corresponding Korean Application No. 10-2023-7014696, dated Apr. 22, 2024, pp. 1-5.

European Office Action issued in corresponding European Application No. 20786519.7, dated Mar. 11, 2024, pp. 1-4.

India Examination Report issued in corresponding India Application No. 202337025501, dated Feb. 6, 2024, pp. 1-6.

* cited by examiner

*Primary Examiner* — Hoang V Nguyen

(74) *Attorney, Agent, or Firm* — HAUPTMAN HAM, LLP

(57) ABSTRACT

An antenna device. The antenna device includes a first radiating structure that operates at a first frequency band. A second radiating structure operates at a second frequency band. The second radiating structure includes a radiating loop formed along a closed line, wherein the radiating loop is made as a coil extending along the closed line and is electrically invisible at the first frequency band. The second radiating structure operates at the second frequency band that does not affect the performance of the first radiating structure that operate at the first frequency band even when both radiating structures are placed in the vicinity of each other.

16 Claims, 7 Drawing Sheets

ANTENNA DEVICE WITH RADIATING LOOP

CROSS-REFERENCE TO RELATED APPLICATIONS

This application is a continuation of International Application No. PCT/EP2020/077793, filed on Oct. 5, 2020, the disclosure of which is hereby incorporated by reference in its entirety.

BACKGROUND

With the development of new wireless communication technologies, such as fifth generation (5G) or upcoming 6G communication technology, there is a growing demand to develop antenna devices for reliable communication. One of the key technologies to enable the new generation of mobile communications is massive Multiple-Input and Multiple-Output (m MIMO), for example, below 6 gigahertz (GHz). Typically, new deployments of antenna devices in telecom infrastructure continue to face many challenges including local regulations. For example, there are limitations associated with a size of a given antenna that can be deployed. In order to facilitate certain activities related to telecommunication services, such as site acquisition and/or reuse of current mechanical support structures at the sites, it is expected that the form factor and the wind-load of any new antenna that is to be deployed should be similar and comparable to legacy products. Such challenges require to have a higher number of radiating structures or antenna arrays to be integrated under a same radome and share the same area. Among many technical strategies, one of the key points to fulfil these requirements, is that radiating structures designed for two or more frequency bands, for example, low-band (LB) and high-band (HB), when operated in an antenna device (or an array) should be electrically invisible or mutually transparent to each other. However, conventional antenna devices have a technical problem of electrical visibility, in which when a radiating element of one frequency band is placed in the vicinity of other radiating element of a different frequency band, the performance of at least one radiating element is adversely affected. For example, when a lower frequency antenna array is overlaid on a higher frequency antenna array, the radiation generated by the higher frequency antenna array tends to get distorted. Moreover, electromagnetic fields get reflected or reradiated in an unwanted way by the lower frequency antenna array, which reduces higher frequency antenna array's directivity, increases the side lobe value, decreases the front to back ratio, worsens cross-polar discrimination values, etc., which is not desirable.

Therefore, in light of the foregoing discussion, there exists a need to overcome the aforementioned drawbacks associated with the conventional antenna devices, such as dual-band or multi-band antenna devices.

SUMMARY

Embodiments described herein provide an antenna device with a radiating loop.

Embodiments described herein provide a solution to the existing problem of how to achieve mutual electrical invisibility or transparency for radiating structures operating in different frequency bands in a conventional antenna device without degrading performance. An aim of Embodiments described herein is to provide a solution that overcomes at least partially the problems encountered in prior art and provide an improved antenna device with improved electrical invisibility or mutual transparency between two radiating structures operating in at least two different frequency bands as compared to a conventional antenna device.

Solutions are provided in the enclosed independent claims. Advantageous implementations of at least one embodiment is further defined in the dependent claims.

In one aspect, Embodiments described herein provide an antenna device. The antenna device comprises a first radiating structure configured to operate at a first frequency band. A second radiating structure configured to operate at a second frequency band, the second radiating structure comprising a radiating loop formed along a closed line, wherein the radiating loop is made as a coil extending along the closed line and being electrically invisible at the first frequency band.

The antenna device of at least one embodiment manifests improved mutual invisibility (or transparency) in which the second radiating structure that operates at the second frequency band do not affect the performance of the first radiating structure that operate at the first frequency band even in response to both radiating structures being placed in the vicinity of each other. The improved electrical invisibility between two radiating structures is achieved due to the radiating loop. The radiating loop is made as a coil such that an inductance is introduced that is distributed all along the radiating loop. Such inductance changes the impedance of the radiating loop, thereby reducing the amount of scattered field (e.g. the scattered field is lower than −50 dB). In other words, the radiating loop maintains its properties at the desired frequencies (i.e. at the second, lower frequency band) while being transparent (i.e. not reflecting radiation or energy) for the other frequency band (e.g. the first, higher frequency band).

In an implementation form, the radiating loop is arranged on a circumference of the second radiating structure.

As the radiating loop is arranged on a circumference of the second radiating structure, thus the radiating loop occupies a larger area on the second radiating structure, which improves the inductance distributed all along the radiating loop at the circumference, and provides the effect of improved bandwidth of the second radiating structure.

In a further implementation form, the radiating loop has an essentially square shape in a top view.

The shape of the radiating loop dictates the amount of inductance introduced whose response varies with frequency, and thereby contributes in reducing the amount of the scattered field to improve the electrical invisibility between the radiating structures. Typically, in response to current being passed through a conventional coil, magnetic fields are generated by separate turns of wire, which pass through the centre of the coil and add (i.e. superpose) to produce a strong field. However, in the antenna device of at least one embodiment, any potential magnetic field is nullified by superposition as the coil is shaped as a square.

In a further implementation form, the second frequency band is lower than the first frequency band.

Typically, the use of different frequency bands is directly affect the size of radiating structures, the placement of the radiating structures, and thus the overall size and complexity of a conventional antenna device. Beneficially, the antenna device of at least one embodiment manifests improved mutual invisibility in which the second radiating structure that operates at a lower frequency band do not affect the performance of the first radiating structure that operate at a comparatively higher frequency band even in response to both radiating structures being placed in the vicinity of each other.

In a further implementation form, the second radiating structure overlaps with the first radiating structure in a top view.

As the first radiating structure overlaps with the second radiating structure, a very compact architecture of the antenna device is achieved.

In a further implementation form, the coil comprises conductive tracks printed on different layers of a printed circuit board and connected with each other by vias.

By virtue of the use of conductive tracks printed on different layers of the printed circuit board (PCB), etching and defining the width, pitch and length of the coil that defines the radiating loop becomes easy.

In a further implementation form, the coil comprises metal strips printed over a plastic bearing element.

By virtue of the use of the metal strips printed over a plastic bearing element, the manufacturing complexity, cost of maintenance, and an overall cost of the antenna device is reduced.

In a further implementation form, the first radiating structure is configured to be arranged on a lower plane of a support structure in a first distance to a reflector, and the second radiating structure is configured to be arranged on an upper plane of the support structure in a second distance from the lower plane.

The arrangement of the first and the second radiating structures at a first and the second distance from the lower planes enables the antenna device to radiate electromagnetic signals in multi-band with reduced interference, where the use of the radiation loop makes the interference almost negligible.

Devices, elements, circuitry, units and means described in at least one embodiment is able to be implemented in the software or hardware elements or any kind of combination thereof. All steps which are performed by the various entities described in at least one embodiment as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, a skilled person recognizes that these methods and functionalities are implemented in respective software or hardware elements, or any kind of combination thereof. Features of the embodiments descry bed herein are susceptible to being combined in various combinations without departing from the scope of embodiments as defined by the appended claims.

Additional aspects, advantages, features and objects of at least one embodiment is made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood in response to reading in conjunction with the appended drawings. For the purpose of illustrating at least one embodiment, exemplary constructions of at least one embodiment are shown in the drawings. However, at least one embodiment is not limited to specific methods and instrumentalities disclosed herein. Moreover, those in the art will understand that the drawings are not to scale. Like elements have been indicated by identical numbers.

Embodiments are described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. In response to a number being non-underlined and accompanied by an associated arrow, the non-underlined number is used to identify a general item at which the arrow is pointing.

DETAILED DESCRIPTION OF EMBODIMENTS

The following detailed description illustrates embodiments and ways in which at least one embodiment is to be implemented. Although some modes of carrying out at least one embodiment have been disclosed, those skilled in the art would recognize that other embodiments for carrying out or practicing embodiments described herein are contemplated.

Figure 1A:
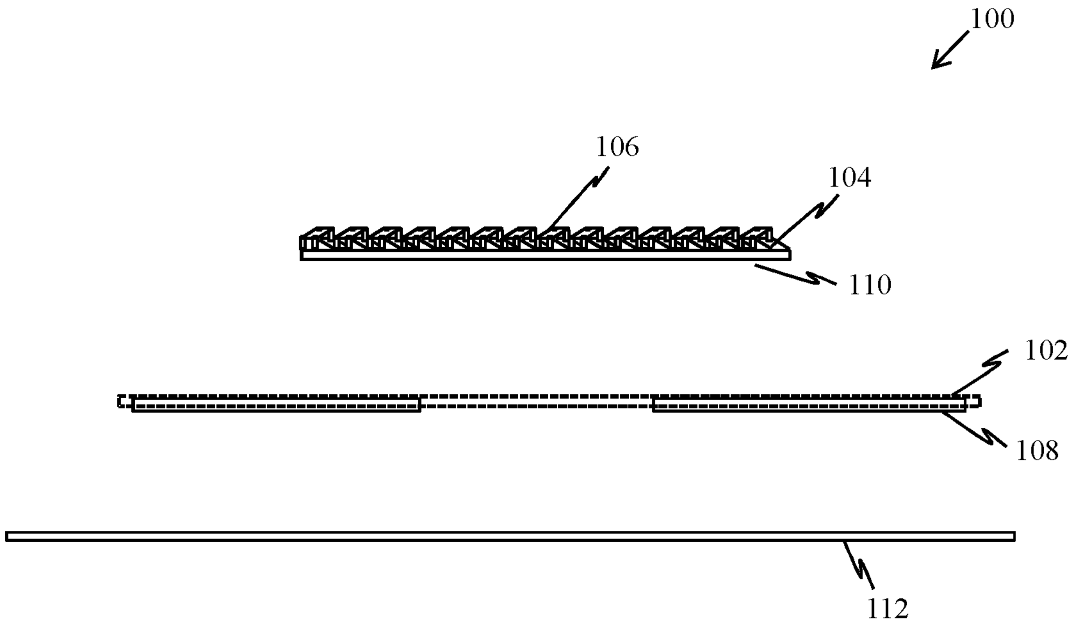
FIG. 1A is a side view of an exemplary arrangement of a first radiating structure with respect to a second radiating structure in an antenna device, in accordance with at least one embodiment.

FIG. 1A is a side view of an exemplary arrangement of a first radiating structure 102 and a second radiating structure 104 in an antenna device 100. With reference to FIG. 1A, there is shown a side view of the first radiating structure 102 on a first substrate 108 and the second radiating structure 104 with a radiating loop 106 on a second substrate 110. In the shown example, a reflector 112 is arranged beneath the two radiating structures 102, 104. FIG. 1A is used to depict an exemplary mutual arrangement of the second radiating structure 104 over the first radiating structure 102. The second radiating structure 104 that includes the radiating loop 106 is shown and described in detail, for example, in FIG. 1C to 1F.

The antenna device 100 is configured to radiate electromagnetic signals in two frequency bands concurrently. In an example, the antenna device 100 is referred to as a dual-band antenna device or a multi-band antenna device. The antenna device 100 is used in wireless communication systems. Examples of such wireless communication systems include, but are not limited to a base station (such as an Evolved Node B (eNB), or a Next Generation NodeB (gNB)), a repeater device, or other customized telecommunication hardware.

The first radiating structure 102 refers to a radiating element or a radiator of the antenna device 100. The first radiating structure 102 that is configured to operate at a first frequency band. In an implementation, the first radiating structure 102 includes a plurality of radiating elements that operate at the first frequency band. The first radiating structure 102 is printed on the first substrate 108.

The second radiating structure 104 includes a plurality of radiating elements and the radiating loop 106. The second radiating structure 104 is configured to operate at a second frequency band that is different from the first frequency band. For example, the second frequency band is lower than the first frequency band. The second radiating structure 104 is printed on the second substrate 110.

The radiating loop 106 is an electrically conductive element comprised in the second radiating structure 104 of the antenna device 100. The radiating loop 106 increases the bandwidth of the second radiating structure 104, reduces its beam width, and improves isolation of the second radiating structure 104 with adjacent radiating element, such as the first radiating structure 102, and at the same time the radiating loop 106 is electrically invisible for the first frequency band radiated by the first radiating structure 102.

The first substrate 108 acts as a base for the first radiating structure 102, whereas the second substrate 110 acts as a base for the second radiating structure 104. In an implementation, each of the first substrate 108 and the second substrate 110 is a printed circuit board (PCB). Each of the first substrate 108 or the second substrate 110 is a single layer or a dual layer printed circuit board. In an implementation, the second substrate 110 is a dual-layer printed circuit board, where the top and bottom layers of the PCB are used to etch and define the width, pitch, and length of a coil that defines the radiating loop 106. In an example, the first substrate 108 and the second substrate 110 is a FR4 substrate.

The reflector 112 is provided in the antenna device 100 in order to reflect and redirect RF energy in a desired direction. The reflector 112 is arranged in a first distance (i.e. closer) to the first radiating structure 102, and the second radiating structure 104 is arranged in a second distance from the first radiating structure 102.

Figure 1B:
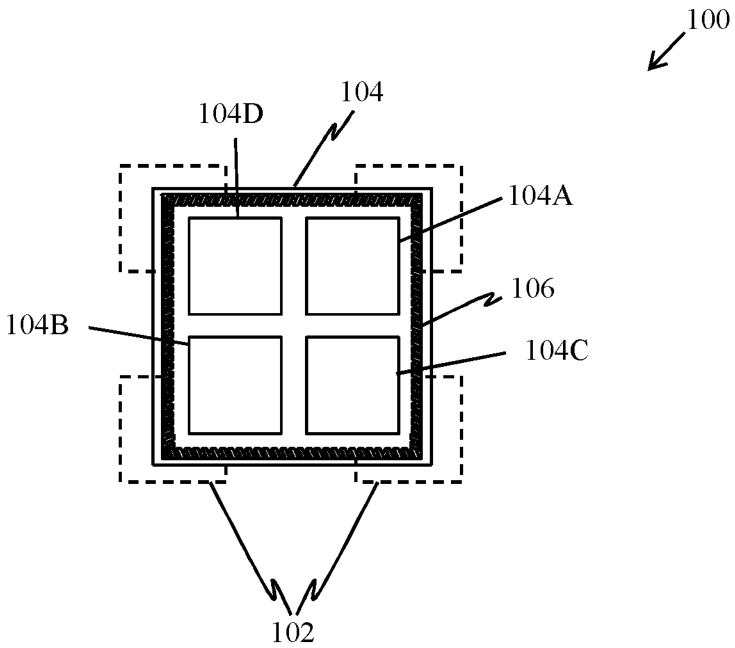
FIG. 1B is a top view of an exemplary arrangement of a first radiating structure with respect to a second radiating structure in an antenna device, in accordance with at least one embodiment.

FIG. 1B is a top view of an exemplary arrangement of the first radiating structure 102 with respect to the second radiating structure 104 in the antenna device 100, in accordance with at least one embodiment. With reference to FIG. 1B, there is shown the second radiating structure 104 that overlaps with the first radiating structure 102 in a top view. The second radiating structure 104 includes a plurality of radiating elements, such as a first radiating element 104A, a second radiating element 104B, a third radiating element 104C, and a fourth radiating element 104D. In this embodiment, the second radiating structure 104 includes four radiating elements, the four radiating elements form two electric dipoles. Alternatively, in some implementations, the second radiating structure 104 includes one radiating element instead of multiple elements. A person of ordinary skill in the art understands that the number of radiating elements within the second radiating structure 104 is increased or decreased without limiting the scope of embodiments described herein. There is further shown the radiating loop 106 comprised in the second radiating structure 104 that surrounds the plurality of radiating elements, such as the first radiating element 104A, the second radiating element 104B, the third radiating element 104C, and the fourth radiating element 104D.

In operation, the first radiating structure 102 is configured to operate at a first frequency band, while the second radiating structure 104 is configured to operate at a second frequency band. The second radiating structure 104 includes the radiating loop 106 formed along a closed line, wherein the radiating loop 106 is made as a coil extending along the closed line and being electrically invisible at the first frequency band. Alternatively stated, the first radiating structure 102 radiates radio frequency (RF) signals in the first frequency band that is different from the second frequency band in which the second radiating structure 104 radiates RF signals. As shown, the first radiating structure 102 and the second radiating structure 104 are arranged in vicinity of each other, and potentially communicate RF signals in their respective frequency bands concurrently. The radiating loop 106 of the second radiating structure 104 does not affect the performance of the first radiating structure 102 that operates at higher frequency band even in response to both radiating structures being placed in the vicinity of each other. An example of the radiating loop 106 formed as a continuous closed line is shown and further described in FIG. 1D. As the radiating loop 106 is in the form of a coil, an inductance is introduced that is distributed all along the coil, in response to being in operation. Such inductance potentially changes the impedance of the radiating loop 106, thereby reducing the amount of scattered field. In other words, the radiating loop 106 maintains its properties at the desired frequencies (i.e. at the second, lower frequency band) while being transparent (i.e. not reflecting radiation or energy) to the first frequency band (e.g. higher frequency band).

In accordance with an embodiment, the second radiating structure 104 overlaps with the first radiating structure 102 in a top view. The second radiating structure 104 is arranged over the first radiating structure 102 (as shown in FIG. 1B, in an example), which ensures a compact architecture to the antenna device 100. In an implementation, the second radiating structure 104 resemble almost a planar structure that is printed on the second substrate.

Typically, in conventional dual-band antenna devices, in response to a lower frequency radiating element (or lower frequency array) being overlaid on a higher frequency radiating element (or higher frequency array), the radiation generated by the higher frequency radiating element (or higher frequency array) tends to get distorted by the lower frequency radiating element (or lower frequency array). Moreover, electromagnetic fields get reflected or reradiated in an unwanted way by the lower frequency radiating element (or lower frequency array) which reduces higher frequency radiating element's (or higher frequency array's) directivity, increases the side lobes, decreases the front to back, worsens the cross polar discrimination, etc. In contradiction to the conventional dual-band antenna devices, the radiating loop 106 of the second radiating structure 104 that surrounds all the radiating elements of second radiating structure 104, avoid or at least significantly reduce any distortion of radiation generated by the first radiating structure 102. Thus, in a way the radiating loop 106 enables mutual invisibility or transparency, where the second radiating structure 104 of one frequency band (e.g. lower frequency band) in the vicinity of the first radiating structure 102 of a different frequency band (higher frequency) does not affect the performance of each other. Alternatively, in response to the rest elements of the second radiating structure 104 being designed to be electrically invisible at the first frequency band, by means of any appropriate known techniques, the whole second radiating structure 104, including the radiating loop 106, will be electrically transparent to the first frequency band.

Figure 1C:
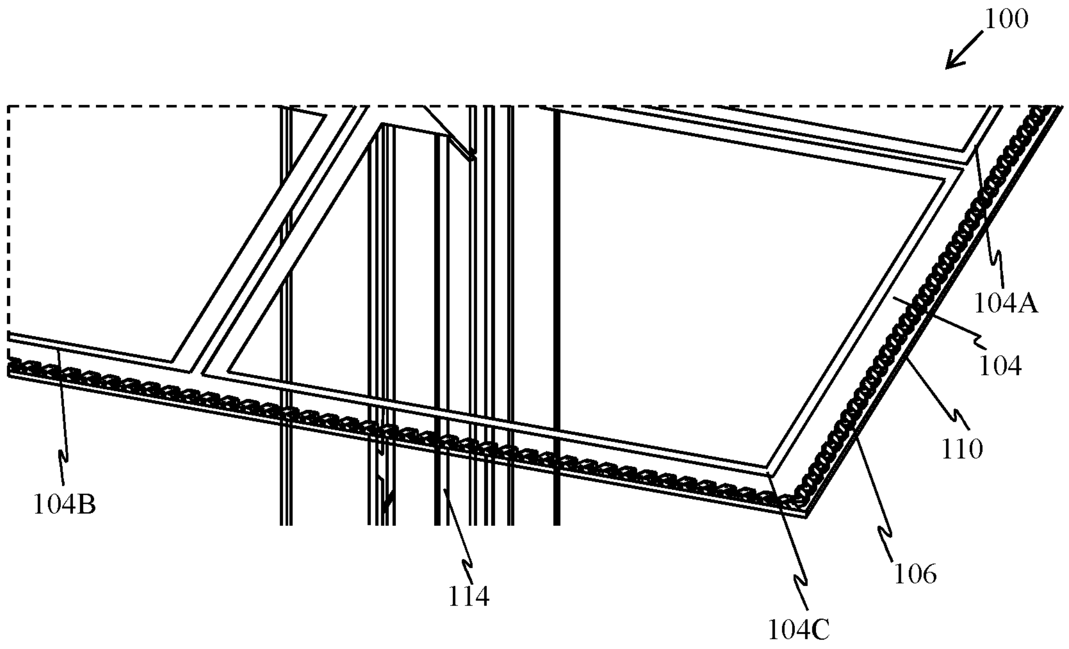
FIG. 1C is an illustration of a portion of an antenna device, in accordance with at least one embodiment.

FIG. 1C is an illustration of a portion of an antenna device, in accordance with at least one embodiment. FIG. 1C is described in conjunction with elements from FIGS. 1A and 1B. With reference to FIG. 1C, there is shown the second radiating structure 104 of the antenna device 100. The second radiating structure 104 includes the radiating loop 106 and a plurality of radiating elements, such as the first radiating element 104A, the second radiating element 104B, and the third radiating element 104C, enclosed in the radiating loop 106. The second radiating structure 104 is printed on the second substrate 110, which is arranged on a support structure 114.

In this embodiment, the second radiating structure 104 includes four radiating elements (the fourth not visible as only a portion of the antenna device 100 is depicted in FIG. 1C), the four radiating elements form two electric dipoles. The second radiating structure 104 is configured to operate at a second frequency band that is different from the first frequency band. For example, the second frequency band is lower than the first frequency band.

The support structure 114 provides support and mechanical strength to the first substrate (e.g. the first substrate 108 of FIG. 1A) as well as to the second substrate 110. In an example, the support structure 114 is made of plastic.

In accordance with an embodiment, the radiating loop 106 is arranged on a circumference of the second radiating structure 104. The radiating loop 106 adds an inductance that is distributed all along the radiating loop 106 placed on the circumference (i.e. near edges) of the second radiating structure 104. Moreover, the shape (including density, radius, number of turns per defined length, etc.) of the radiating loop 106 dictates the amount of inductance introduced and, the frequency response varies with the operating frequency of the first radiating structure (e.g. the first radiating structure 102 of FIGS. 1A and 1B) and the second radiating structure 104. The amount of inductance added by the radiating loop 106 changes the impedance of the radiating loop 106 accordingly and makes the radiating loop electrically transparent for the first frequency band. In some implementations, the transparency is achieved whenever scattered field value is lower than −50 decibel (dB). The scattered field is potentially a measure of surface current at the first frequency bands (e.g. higher frequency band).

Figure 1D:
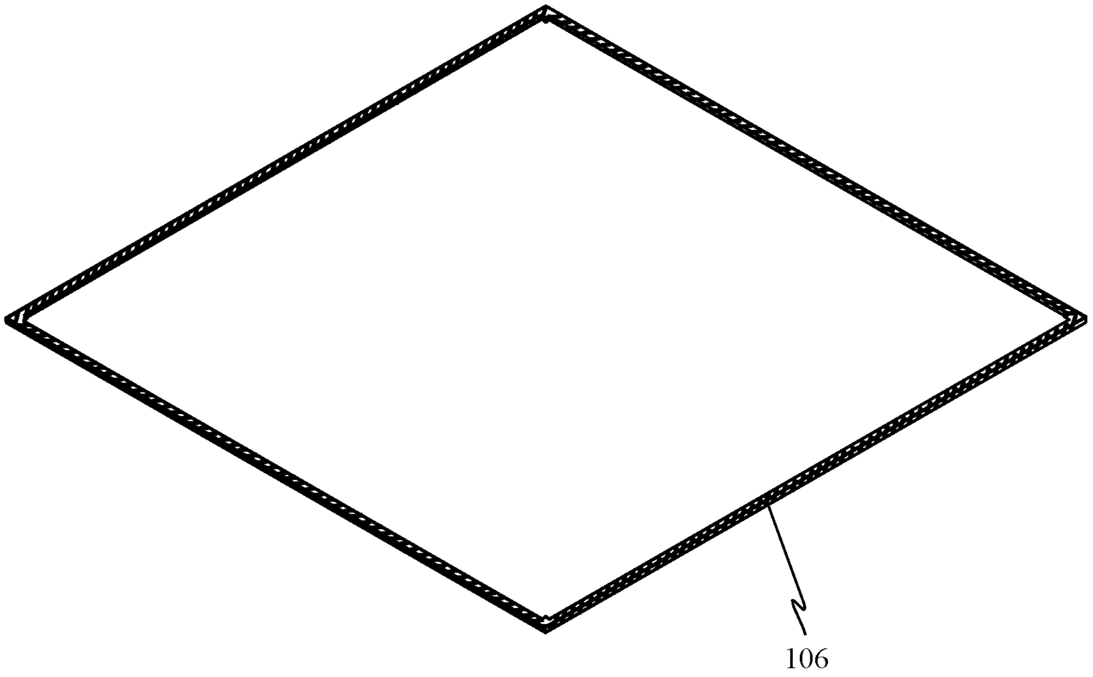
FIG. 1D is an illustration of a square-shaped radiating loop of the antenna device of FIG. 1C, in accordance with at least one embodiment.

In accordance with another embodiment, the radiating loop 106 has essentially square shape in a top view. The radiating loop 106 is arranged on the second radiating structure 104 along the closed line, and the closed line describes a square shape. The radiating loop 106 in the top view represents a shape of the square, as shown in FIG. 1D, in an example. Typically, in response to current being passed through a conventional coil, magnetic fields is generated by separate turns of wire, which pass through the centre of the coil and add (i.e. superpose) to produce a strong magnetic field. However, in the antenna device 100, any potential magnetic field is nullified by superposition as the coil that defines the radiating loop 106 is shaped as a square. The shape and structure of the radiating loop 106 is further described in detail, for example, in FIGS. 1D, 1E, and In accordance with an embodiment, the second frequency band is lower than the first frequency band. The second frequency band is the frequency band in which the second radiating structure 104 operates, whereas the first radiating structure (e.g. the first radiating structure 102 of FIGS. 1A and 1B) operates in the first frequency band. Alternatively stated, the first radiating structure is configured to operate at a frequency that is higher than the second frequency band. For example, the first frequency band corresponds to a medium band (e.g. 1.427 to 2.2 GHz) or a high band (e.g. 1.71 to 2.69 GHz), and the second frequency band is lower than the first frequency band (e.g. a low band, such as 690 to 960 MHz). In another example, the first frequency band corresponds to "F1" band that is mmWave frequency of 5G NR frequency band, whereas the second frequency band corresponds to "F2" frequency band (i.e. sub-6 GHz frequency).

In accordance with an embodiment, the first radiating structure (e.g. the first radiating structure 102 of FIGS. 1A and 1B) is configured to be arranged on a lower plane of the support structure 114 in a first distance to the reflector (e.g. the reflector 112 of FIG. 1A), and the second radiating structure 104 is configured to be arranged on an upper plane of the support structure 114 in a second distance from the lower plane. The support structure 114 provides support and mechanical strength to the first substrate (e.g. the first substrate 108 of FIG. 1A) as well as to the second substrate 110. The support structure 114 has a lower plane and the upper plane. The first substrate (e.g. the first substrate 108 of FIG. 1A) is arranged on the lower plane of the support structure 114, and the first substrate acts as a base for the first radiating structure. The second substrate 110 is arranged on the upper plane of the support structure 114, and the second substrate 110 acts as a base for the second radiating structure 104. The arrangement of the first radiating structure and the second radiating structure 104 at different distances from the reflector plane enables the antenna device 100 to radiate electromagnetic signals in different frequency bands with reduced interference, where the use of the radiating loop 106 in the second radiating structure 104 further makes signal interference almost negligible. Moreover, the reflector is integrated in the antenna device 100 in order to reflect and redirect RF energy in a desired direction. The reflector (e.g. the reflector 112 of FIG. 1A) is arranged closer to the lower plane of the support structure 114 than the upper plane of the support structure 114. In other words, the first radiating structure arranged on the lower plane of the support structure 114 is at the first distance from the reflector (i.e. comparatively closer to the reflector), whereas the second radiating structure 104 in response to being positioned on the upper plane of the support structure 114 at the second distance (i.e. at a greater distance) from the lower plane and comparatively not so close to the reflector. The reflector by reflecting the RF energy, increases gain in a given direction.

FIG. 1D is an illustration of a radiating loop of the antenna device of FIG. 1C, in accordance with at least one embodiment. FIG. 1D is described in conjunction with elements from FIG. 1C. With reference to FIG. 1D, there is shown a configuration of a radiating loop such as the radiating loop 106 of the antenna device 100 of FIG. 1C.

The radiating loop 106 is made as a coil and arranged on a circumference of the second radiating structure 104. The radiating loop 106 adds an inductance that is distributed all along the radiating loop 106 which is placed on the circumference (i.e. near edges) of the second radiating structure 104. Generally, a value of inductance (represented by L) of the radiating loop 106 (or the coil) depends on the shape (e.g. density, radius, etc.) of the radiating loop 106 (or the coil) according to the following equation (equation 1)

$$L = \frac{\mu N^2 A}{l} \quad (1)$$

where, A is cross sectional area of the radiating loop 106 (or coil), 1 is length of the radiating loop 106 (or coil) and N is number of turns of the radiating loop 106 (or coil). For a given value of inductance (i.e. L) of the radiating loop 106 (or coil), the frequency response of the radiating loop 106 varies according to an operating frequency. This is because the impedance (represented by Zl) of the radiating loop 106 depends on the operating frequency and the inductance (i.e. L) of the radiating loop 106 according to the following equation (i.e. equation 2)

$$Zl = j\omega L \quad (2)$$

where, Zl is impedance offered by the radiating loop 106 to the first radiating structure 102 of the antenna device 100.

For the given value of inductance (i.e. L), the impedance (i.e. Zl) depends only upon the operating frequency. Therefore, at a low frequency, the impedance (i.e. Zl) is low and the radiating loop 106 (or coil) acts as a short circuit and behaves like a typical coil. However, at a high frequency, the impedance (i.e. Zl) becomes high and the radiating loop 106 (or coil) acts as an open circuit (or transparent). Thus, by virtue of the high impedance (i.e. Zl), the coil that defines the radiating loop 106 become transparent (i.e. open circuit) to the first frequency band (i.e. higher frequency band) which is radiated by the first radiating structure 102. Additionally, the radiating loop 106 (or coil) behaves like a series of non-connected strips.

For a given value of frequency, the impedance (i.e. Zl) depends only upon the inductance (i.e. L) which varies in direct proportionate with the number of turns (i.e. N) and the cross-sectional area of the radiating loop 106 (or coil). Higher the number of turns (or higher the density), higher is the value of inductance, and higher is the resulting impedance (i.e. Zl). Hence, at high density, the radiating loop 106 (or coil) acts like an open circuit. In this way, by controlling the density or by controlling the number of turns of the coil that defines the radiating loop 106, the radiating loop 106 is made transparent (i.e. open circuit) at the first frequency band. Therefore, by use of the radiating loop 106 in the second radiating structure 104, the radiation pattern of the first radiating structure 102 (of FIGS. 1A and 1B) is not affected.

The radiating loop 106 is arranged along the closed line, and the closed line describes a square shape. Typically, in response to current being passed through a conventional coil, magnetic fields is generated by separate turns of wire, which pass through the centre of the coil and add (i.e. superpose) to produce a strong magnetic field. However, in the antenna device 100, any potential magnetic field is nullified by superposition as the coil that defines the radiating loop 106 is shaped as a square.

Figure 1E:
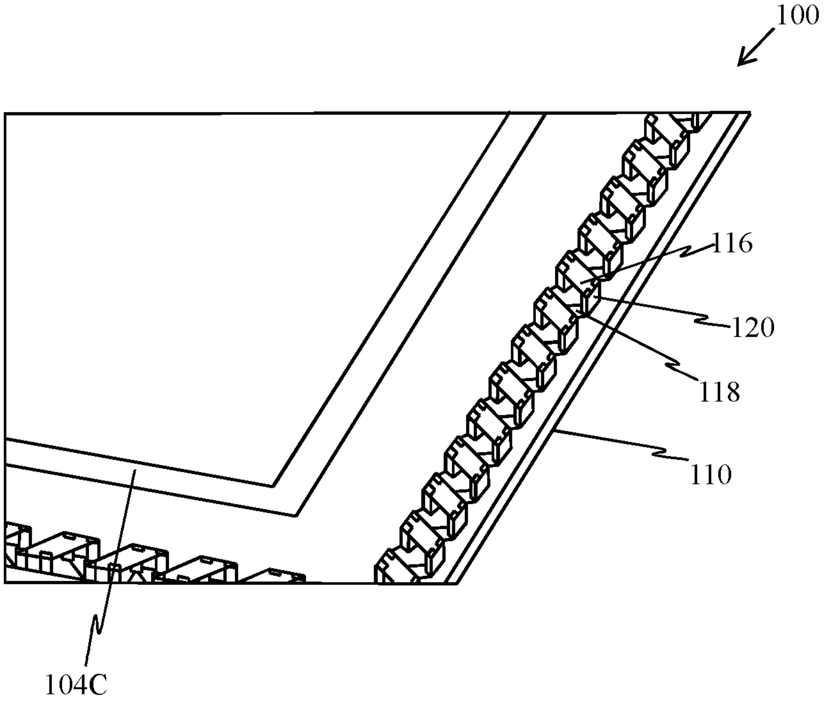
FIG. 1E is an illustration of a portion of an antenna device with a close-up view of a radiating loop, in accordance with at least one embodiment.

FIG. 1E is an illustration of a portion of an antenna device with a close-up view of a radiating loop, in accordance with at least one embodiment. FIG. 1E is described in conjunction with elements from FIGS. 1C and 1D. With reference to FIG. 1E, there is shown a portion of an antenna device (such as the antenna device 100) with a close-up view of a radiating loop (such as the radiating loop 106). The radiating loop 106 includes an upper conductive track 116 and a lower conductive track 118. The upper conductive track 116 and the lower conductive track 118 are connected with each other by use of a plurality of vias 120.

The radiating loop 106 (or the coil) comprises conductive tracks such as the upper conductive track 116 and the lower conductive track 118 which are printed on different layers of a printed circuit board (PCB). The different layers of the PCB include top and bottom layers which are used to etch and define a width, pitch and length of the radiating loop 106 (or the coil). The plurality of vias 120 is used to connect the top and bottom layers of the PCB. The plurality of vias 120 used depends on the width of the upper conductive track 116 and the lower conductive track 118. Typically, one or two vias of the plurality of vias 120 are enough to connect the upper conductive track 116 and the lower conductive track 118. However, one of ordinary skill in the art understands that the number of vias in the plurality of vias 120 is able to be different without limiting the scope of embodiments described herein.

The upper conductive track 116 and the lower conductive track 118 have a quadratic (i.e. a polygon with four edges or sides) shape and are connected to each other through the plurality of vias 120. The plurality of vias 120 are arranged on the edges of the upper conductive track 116 and the lower conductive track 118. The plurality of vias 120 are configured to support the upper conductive track 116 and the lower conductive track 118.

Figure 1F:
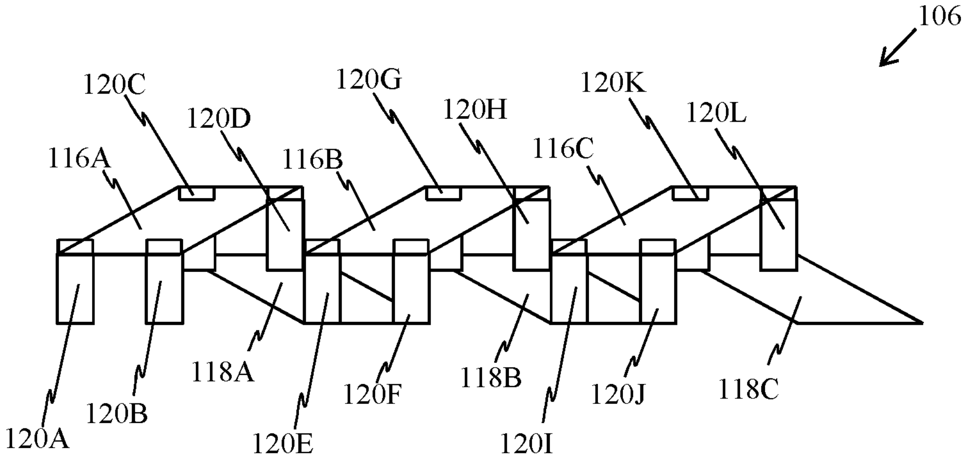
FIG. 1F is an illustration of a radiating loop made as a coil with conductive tracks and vias, in accordance with at least one embodiment.

FIG. 1F is an illustration of a radiating loop made as a coil with conductive tracks and vias, in accordance with at least one embodiment. FIG. 1F is described in conjunction with elements from FIGS. 1B, 1C, 1D, and 1E. With reference to FIG. 1F, there is shown the radiating loop 106 (e.g. the radiating loop 106 of FIGS. 1A to 1D) made as a coil with conductive tracks and vias.

In an implementation, the upper conductive track 116 of the radiating loop 106 includes a plurality of upper conductive tracks such as a first upper conductive track 116A, a second upper conductive track 116B, and a third upper conductive track 116C. Similarly, the lower conductive track 118 of the radiating loop 106 includes a plurality of lower conductive tracks such as a first lower conductive track 118A, a second lower conductive track 118B, and a third lower conductive track 118C. The upper conductive track 116 and the lower conductive track 118 are arranged diagonally but in the opposite direction as compared to each other. For example, the first upper conductive track 116A is connected with a preceding lower conductive track (not shown here) and with the first lower conductive track 118A using the plurality of vias 120 such as a first via 120A, a second via 120B, a third via 120C and a fourth via 120D. The second upper conductive track 116B is connected to the first lower conductive track 118A and with the second lower conductive track 118B by use of the plurality of vias 120 such as a fifth via 120E, a sixth via 120F, a seventh via 120G, and an eighth via 120H. Similarly, the third upper conductive track 116C is connected to the second lower conductive track 118B and with the third lower conductive track 118C by use of the plurality of vias 120 such as a nineth via 120I, a tenth via 120J, an eleventh via 120K, and a twelfth via 120L.

Figure 2A:
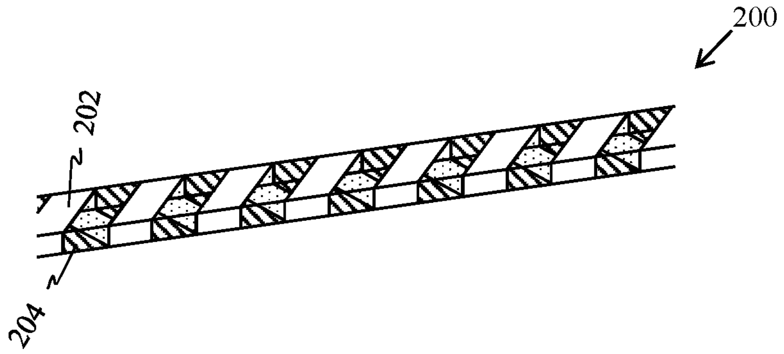
FIG. 2A is an illustration of a radiating loop with metal strips printed over a plastic bearing element, in accordance with at least one embodiment.

FIG. 2A is an illustration of a radiating loop with metal strips printed over a plastic bearing element, in accordance with at least one embodiment. FIG. 2A is described in conjunction with elements from FIGS. 1A to 1F. With reference to FIG. 2A, there is shown a radiating loop 200. The radiating loop 200 includes a plurality of metal strips 202 which is printed over a plastic bearing element 204.

The radiating loop 200 corresponds to the radiating loop 106 of FIG. 1C. In an implementation, polyethylene plastic (PEP) or a similar technology is used to print (i.e. etch or deposit) the plurality of metal strips 202 over the plastic bearing element 204 in order to generate the radiating loop 200. The plurality of metal strips 202 and the plastic bearing element 204 are of the same dimensions throughout the circumference of the second radiating structure 104. The plurality of metal strips 202 are arranged around the plastic bearing element 204 in a continuous manner. However, one of ordinary skill in the art understands that another similar technology is able to be used to print the plurality of metal strips 202 over the plastic bearing element 204 without limiting the scope of at least one embodiment.

Figure 2B:
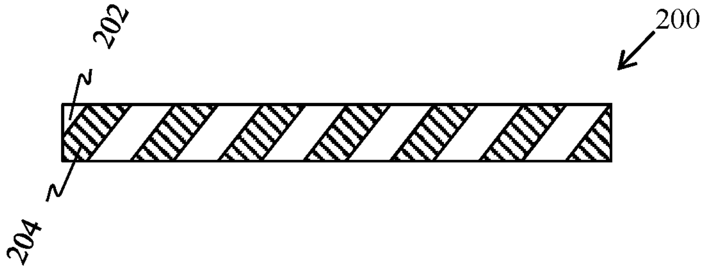
FIG. 2B is a top view of the radiating loop of FIG. 2A, in accordance with at least one embodiment.

FIG. 2B is a top view of the radiating loop of FIG. 2A, in accordance with at least one embodiment. FIG. 2B is described in conjunction with elements from FIG. 2A. With reference to FIG. 2B, there is shown a top view of the radiating loop 200 of FIG. 2A. In the top view, the plurality of metal strips 202 of the radiating loop 200 appears to have a quadratic shape and diagonally arranged over the top surface of the plastic bearing element 204.

Figure 2C:
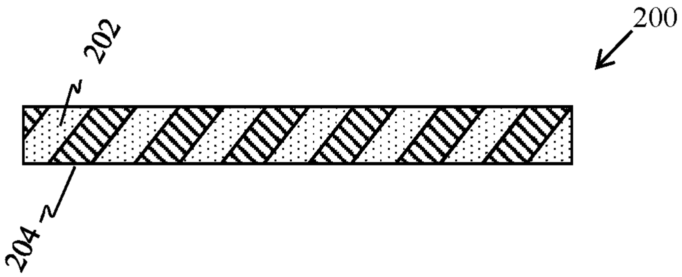
FIG. 2C is a bottom view of the radiating loop of FIG. 2A, in accordance with at least one embodiment.

FIG. 2C is a bottom view of the radiating loop of FIG. 2A, in accordance with at least one embodiment. FIG. 2C is described in conjunction with elements from FIG. 2A. With reference to FIG. 2C, there is shown a bottom view of the radiating loop 200 of FIG. 2A. In the bottom view, the plurality of metal strips 202 of the radiating loop 200 appears to have a quadratic shape and arranged on bottom surface of the plastic bearing element 204.

Figure 2D:
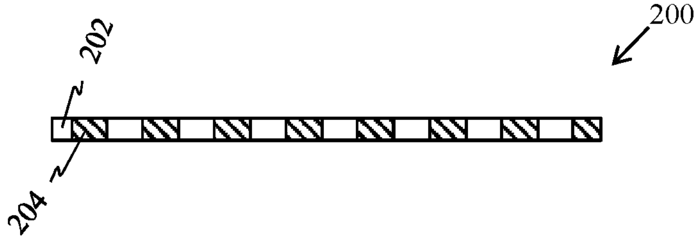
FIG. 2D is a side view of the radiating loop of FIG. 2A, in accordance with at least one embodiment.

FIG. 2D is a side view of the radiating loop of FIG. 2A, in accordance with at least one embodiment. FIG. 2D is described in conjunction with elements from FIG. 2A. With reference to FIG. 2D, there is shown a side view of the radiating loop 200 of FIG. 2A. In the side view, the plurality of metal strips 202 of the radiating loop 200 appears to have a rectangular shape and arranged on side surface of the plastic bearing element 204.

Figure 3:
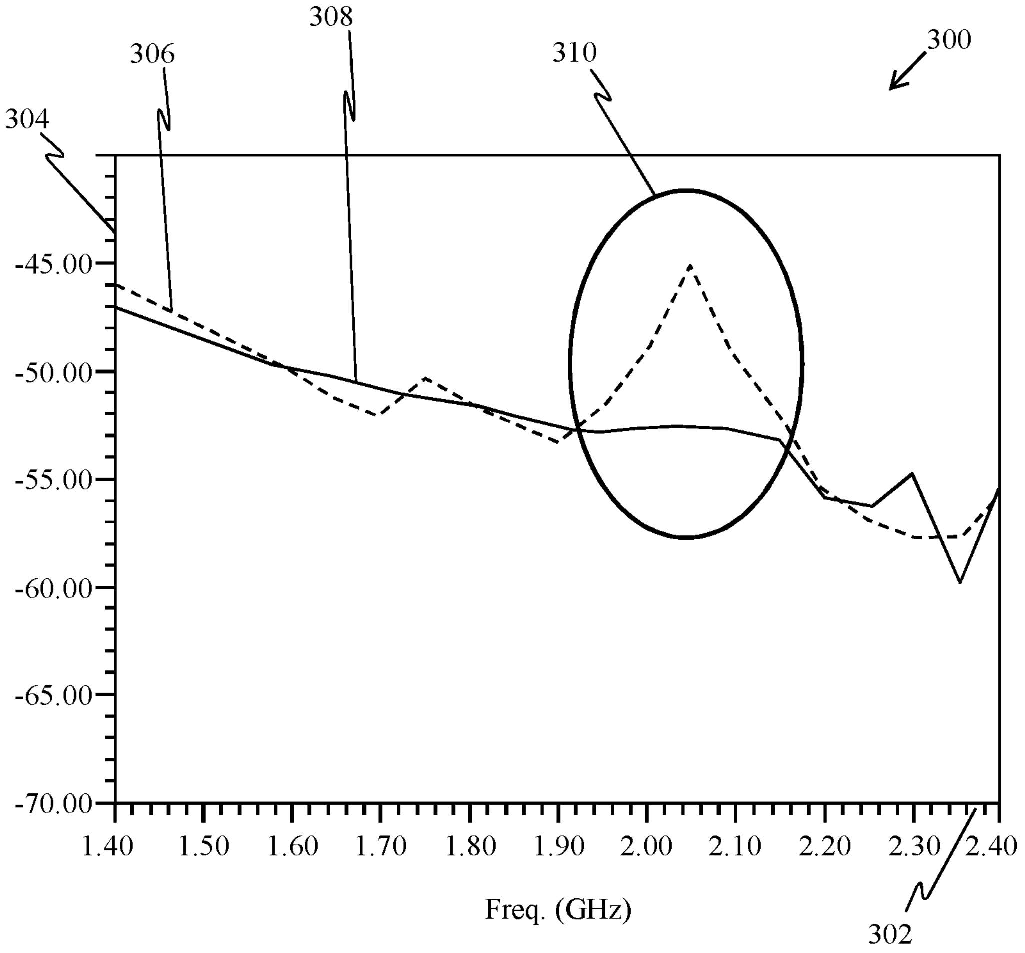
FIG. 3 is a graphical representation that illustrates scattering analysis of an antenna device, in accordance with at least one embodiment.

FIG. 3 is a graphical representation that illustrates scattering analysis of an antenna device, in accordance with at least one embodiment. FIG. 3 is described in conjunction with elements from FIGS. 1A to 1F, and 2A to 2D. With reference to FIG. 3, there is shown a graphical representation 300 of an antenna device such as the antenna device 100 of FIG. 1C. The graphical representation 300 includes a X-axis 302 that denotes frequency in Gigahertz (GHz) and a Y-axis 304 that represents scattered power in decibel (dB).

The scattering analysis of the antenna device 100 is performed by use of a high frequency structure simulator (HFSS) tool. In the graphical representation, a first line 306 represents scattering behaviour of a conventional antenna device. A second line 308 represents scattering behaviour of the antenna device 100. The graphical representation 300 further includes an elliptical region 310 which highlights a difference between the scattering behaviour of the conventional antenna device and the antenna device 100 at a high frequency range (approximately 1.90 GHz-2.20 GHz). In the elliptical region 310, the antenna device 100 has lower value of the scattered field (i.e. less than −50 dB) in comparison to the conventional antenna device. The reason is that in the conventional antenna device, a typical ring is used that is not transparent at the high frequency range and degenerates the radiation pattern of any radiating structure (or antenna array) which is placed below the typical ring. However, in the antenna device 100, the ring in the form of the radiating loop 106 (of FIG. 1C) becomes transparent to the first radiating structure 102 which is placed below the radiating loop 106 and hence, the radiating loop 106 does not affect the radiation pattern of the first radiating structure 102. Thus, the antenna device 100 manifests lower value of the scattered field (i.e. less than −50 dB) because of the radiating loop 106.

Figure 4:
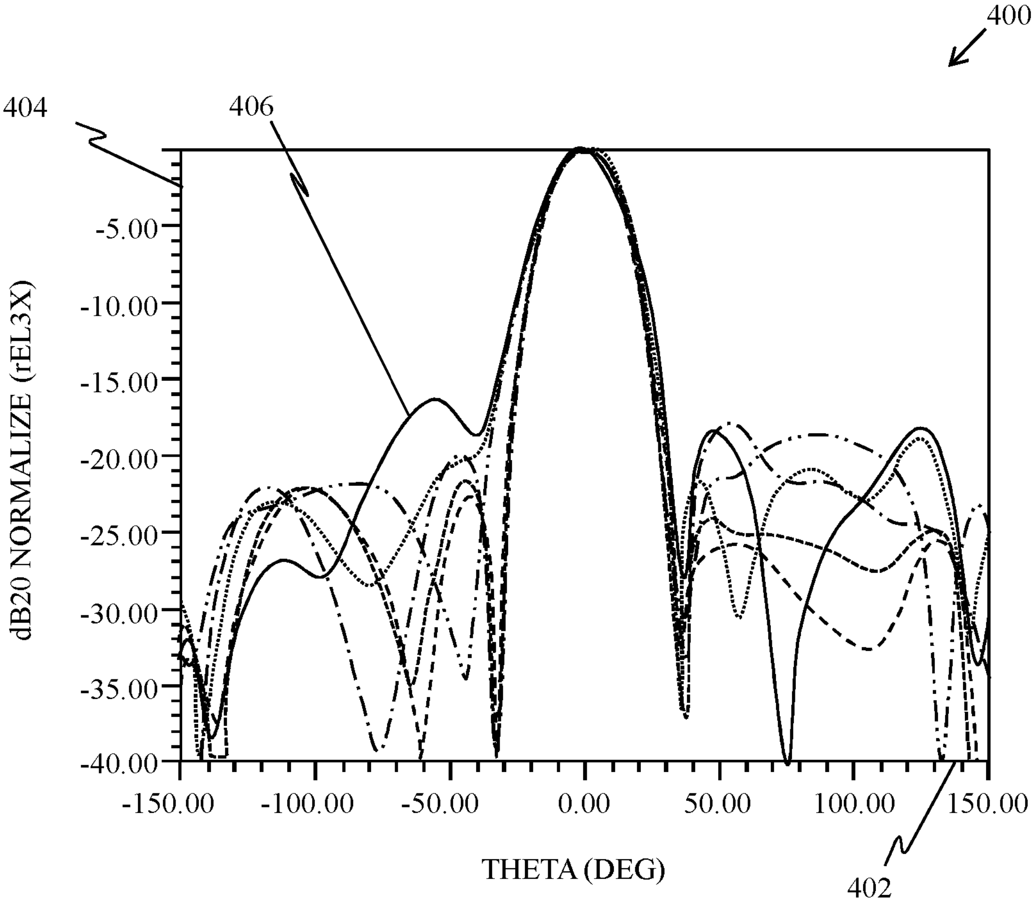
FIG. 4 is a graphical representation that depicts a radiation pattern of an antenna device, in accordance with at least one embodiment.

FIG. 4 is a graphical representation that depicts a radiation pattern of an antenna device, in accordance with at least one embodiment. FIG. 4 is described in conjunction with elements from FIGS. 1C to 1F, 2A to 2D, and 3. With reference to FIG. 4, there is shown a graphical representation 400 that represents a radiation pattern of an antenna device such as the antenna device 100 of FIG. 1C. The graphical representation 400 includes a X-axis 402 that represents Theta values in degree (deg) and a Y-axis 404 that represents normalized values of the radiation field in decibel (dB).

In the graphical representation 400, a plurality of lines 406 represents various radiation patterns of the antenna device 100. The radiation patterns represented by the plurality of lines 406 are obtained in response to the radiating loop 106 of the second radiating structure 104 (or the low frequency array) being transparent (i.e. open circuit) to the first radiating structure 102 (or the high frequency array) at high frequencies. Hence, the radiating loop 106 does not affect the radiation pattern of the first radiating structure 102. Therefore, the antenna device 100 exhibits lower values of the scattered field in comparison to a conventional antenna device which exhibits relatively higher values of the scattered field. In the conventional antenna device, a conventional antenna array operating at a lower frequency and including a typical ring (or ring along with probes) is not transparent to another antenna array operating at a higher frequency, and thus, deteriorates the radiation pattern of the antenna array operating at the higher frequency. Therefore, the conventional antenna device exhibits higher values of the scattered field which is not preferable.

Figure 5:
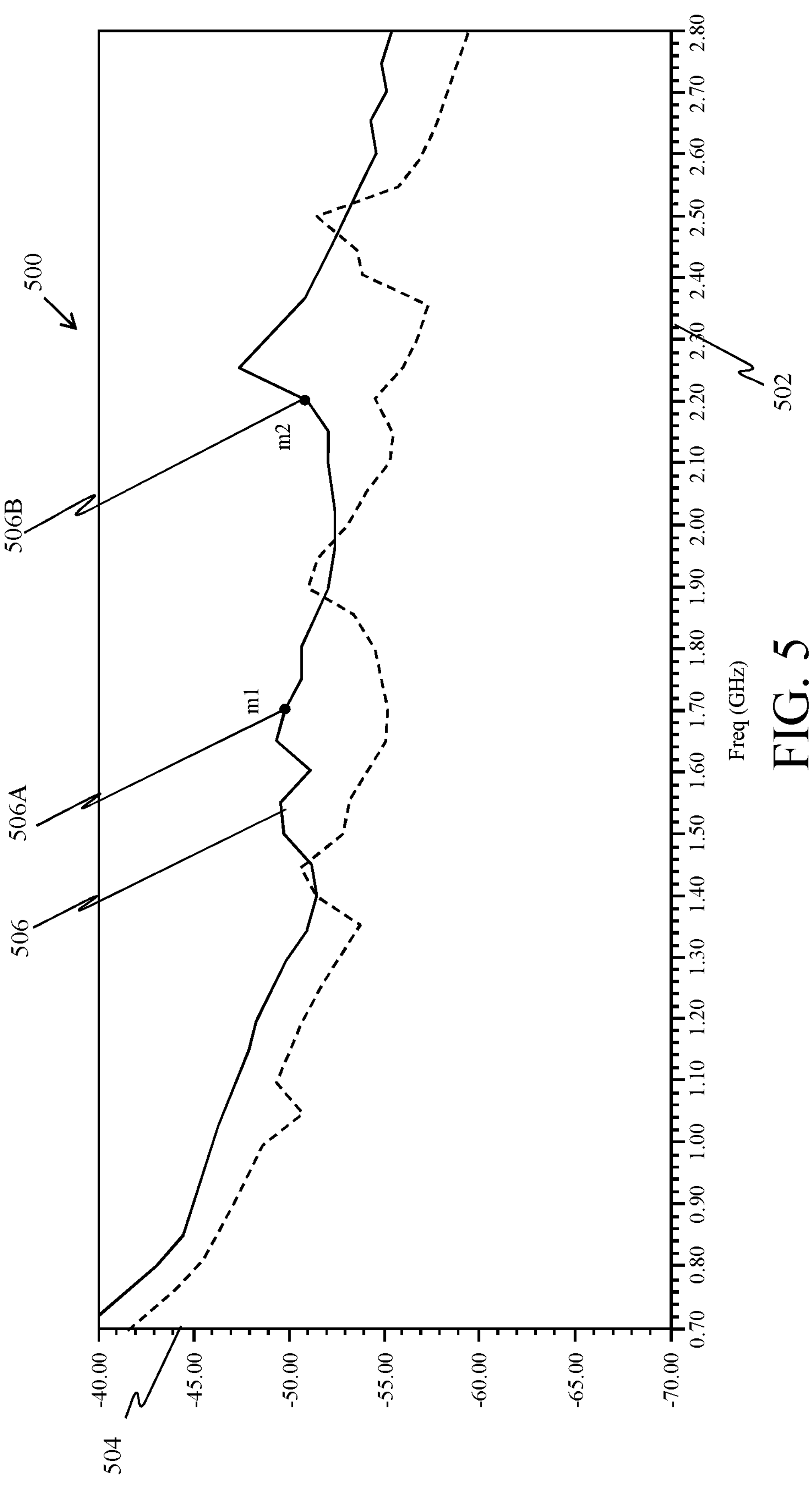
FIG. 5 is a graphical representation that depicts variation of scattered field values versus operating frequency of an antenna device, in accordance with at least one embodiment.

FIG. 5 is a graphical representation that depicts variation of scattered field values versus operating frequency of an antenna device, in accordance with at least one embodiment. FIG. 5 is described in conjunction with elements from FIGS. 1C to 1F. With reference to FIG. 5, there is shown a graphical representation 500 that represents variation of scattered field values versus operating frequency of an antenna device such as the antenna device 100 of FIG. 1C. The graphical representation 500 includes a X-axis 502 that represents frequency in GHz and a Y-axis 504 that represents scattered field values in decibels (dB).

In the graphical representation 500, a first line 506 represents variation of the scattered field values with respect to an operating frequency of the antenna device 100. The first line 506 depicts value of the scattered field decreases with increase in operating frequency of the antenna device 100. The first line 506 includes a first point 506A (also represented as m1) and a second point 506B (also represented as m2). The first point 506A (i.e. m1) has a value of scattered field −49.70 dB at a frequency of 1.7 GHz. The second point 506B (i.e. m2) has a value of scattered field −50.91 dB at a frequency of 2.2 GHz. The second point 506B (i.e. m2) has a relatively lower value of the scattered value because of the high operating frequency. The reason is that by increasing the density of the radiating loop 106, inductance (i.e. L) of the radiating loop 106 increases which further results into an increase in the impedance (i.e. Zl) of the radiating loop 106 according to the equation 2. In addition to the increase in the inductance (i.e. L), there is also an increase in the operating frequency at each step and hence, there is a further increase in the impedance (i.e. Zl). The further increase in the impedance (i.e. Zl) results into a more reduced value of the scattered field. The density of the radiating loop 106 (or the coil) is increased by increasing the number of turns (i.e. N) of the coil.

Modifications to embodiments described in the foregoing are able to be implemented without departing from the scope of embodiments as defined by the accompanying claims. Expressions such as "including", "comprising", "incorporating", "have", "is" used to describe and claim at least one embodiment are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". Certain features of embodiments, which are, for clarity, described in the context of separate embodiments, is also provided in combination in a single embodiment. Conversely, various features of embodiments, which are, for brevity, described in the context of a single embodiment, is also provided separately or in any suitable combination or as suitable in any other described embodiment.

The invention claimed is:

1. An antenna device, comprising:

a first radiating structure configured to operate at a first frequency band and formed on a first plane of a support structure, and a second radiating structure configured to operate at a second frequency band and formed on a second plane of the support structure, the first plane being separated from the second plane by a first distance, the second radiating structure including a radiating loop formed along a closed line, wherein the radiating loop is made as a coil extending along the closed line surrounding the second radiating structure, and being electrically invisible at the first frequency band of the first radiating structure.

2. The antenna device of claim 1, wherein the radiating loop is arranged on a circumference of the second radiating structure.

3. The antenna device of claim 1, wherein the radiating loop has an essentially square shape in a top view.

4. The antenna device of claim 1, wherein the second frequency band is lower than the first frequency band.

5. The antenna device of claim 1, wherein the second radiating structure overlaps with the first radiating structure in a top view.

6. The antenna device of claim 1, wherein the coil includes conductive tracks printed on different layers of a printed circuit board and connected with each other by vias.

7. The antenna device of claim 1, wherein the coil includes metal strips printed over a plastic bearing element.

8. The antenna device of claim 1, wherein the first radiating structure is configured to be arranged on a lower plane of a support structure in a first distance to a reflector, and the second radiating structure is configured to be arranged on an upper plane of the support structure in a second distance from the lower plane.

9. A base station, comprising:

an antenna device, wherein the antenna device includes:

a first radiating structure configured to operate at a first frequency band and formed on a first plane of a support structure, and a second radiating structure configured to operate at a second frequency band and formed on a second plane of the support structure, the first plane being separated from the second plane by a first distance, the second radiating structure including a radiating loop formed along a closed line, wherein the radiating loop is made as a coil extending along the closed line surrounding the second radiating structure, and being electrically invisible at the first frequency band of the first radiating structure.

10. The base station of claim 9, wherein the radiating loop is arranged on a circumference of the second radiating structure.

11. The base station of claim 9, wherein the radiating loop has an essentially square shape in a top view.

12. The base station of claim 9, wherein the second frequency band is lower than the first frequency band.

13. The base station of claim 9, wherein the second radiating structure overlaps with the first radiating structure in a top view.

14. The base station of claim 9, wherein the coil includes conductive tracks printed on different layers of a printed circuit board and connected with each other by vias.

15. The base station of claim 9, wherein the coil includes metal strips printed over a plastic bearing element.

16. The base station of claim 9, wherein the first radiating structure is configured to be arranged on a lower plane of a support structure in a first distance to a reflector, and the second radiating structure is configured to be arranged on an upper plane of the support structure in a second distance from the lower plane.

* * * * *